United States Patent
Tang et al.

(10) Patent No.: US 7,816,840 B2
(45) Date of Patent: Oct. 19, 2010

(54) SPINDLE AND FLEXIBLE HINGE USED IN ULTRASONIC MACHINE

(75) Inventors: Kuo-Yu Tang, Taipei (TW); Chun-Hung Huang, Hsinchu (TW); Yu-Chieh Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 362 days.

(21) Appl. No.: 12/117,187

(22) Filed: May 8, 2008

(65) Prior Publication Data
US 2009/0146530 A1 Jun. 11, 2009

(30) Foreign Application Priority Data
Dec. 20, 2007 (TW) .............................. 96148867 A

(51) Int. Cl.
H01L 41/08 (2006.01)
A47K 13/12 (2006.01)

(52) U.S. Cl. .................. 310/323.18; 310/328; 4/234
(58) Field of Classification Search ............ 310/323.02, 310/323.12, 323.16, 318, 328
See application file for complete search history.

(56) References Cited

U.S. PATENT DOCUMENTS

| | | | | |
|---|---|---|---|---|
| 4,616,447 A | * | 10/1986 | Haas et al. .................. 451/24 |
| 5,140,773 A | * | 8/1992 | Miwa et al. .................. 451/41 |
| 5,144,771 A | * | 9/1992 | Miwa .......................... 451/165 |
| 5,172,023 A | * | 12/1992 | Kawai et al. ............ 310/323.04 |
| 6,498,421 B1 | * | 12/2002 | Oh et al. ................. 310/323.18 |
| 6,762,535 B2 | | 7/2004 | Take et al. |
| 7,175,506 B2 | | 6/2006 | Fiebelkorn et al. |
| 7,389,549 B2 | * | 6/2008 | Vierkant, III ................... 4/236 |

* cited by examiner

*Primary Examiner*—Mark Budd
(74) *Attorney, Agent, or Firm*—Muncy, Geissler, Olds & Lowe, PLLC.

(57) ABSTRACT

A spindle used in an ultrasonic machine for transmitting vibration to a working tool of the ultrasonic machine is disclosed. The spindle includes a main body, a rotor disposed in the main body, an elastic clamping unit disposed in the rotor, a vibrating unit having one end thereof connected to the inner wall of the rotor while the other end connected to the elastic clamping unit, and a pre-pressure unit penetrating the rotor and one end thereof connected to the elastic clamping unit to provide the elastic clamping unit with rigidity against the rotor, thereby making the elastic clamping unit provide pre-pressure to the vibrating unit which further provides the elastic clamping unit with vibration against the rotor. The present invention further provides a flexible hinge for the spindle.

24 Claims, 4 Drawing Sheets

SPINDLE AND FLEXIBLE HINGE USED IN ULTRASONIC MACHINE

BACKGROUND OF THE INVENTION

1. Field of the Invention:

The present invention relates generally to an ultrasonic machining technique, and more particularly to a spindle and a flexible hinge used in an ultrasonic machine.

2. Description of Related Art:

Since it is quite difficult to machine brittle materials such as semiconductors, ceramics, glass or hard alloys through conventional machining techniques using mechanical and thermal energies, there have been developed new machining techniques using such as electric, magnetic, optical, or chemical energies. Ultrasonic machining technique is such an assisting machining technique.

Ultrasonic machining technique applies ultrasonic energy to such as cutting work, wherein vibration in an axial direction generated by an ultrasonic vibrating unit mounted to a rear end of a spindle is transmitted through the spindle and the base of a cutting tool and reaches outer periphery of the cutting tool and is converted to movement in the axial direction. Through the vibration conversion, a desired vibration way needed by the ultrasonic machining can be achieved. Meanwhile, by choosing suitable cutting tools, various types of machining can be performed, such as forming sketched holes, engraving or cutting-off. The ultrasonic machining technique can be performed regardless of whether the workpiece is a conductor or not and particularly suitable to be applied in precision machining of brittle materials. Related techniques are disclosed in such as US Pat. Nos. 6,762,535 and 7,175,506 etc.

US Pat. No. 6,762,535 discloses a spindle structure used in an ultrasonic machine and a supporting born used in the same, wherein, the spindle structure comprises a spindle main body having a main body sleeve, an ultrasonic vibrator housed in the main body sleeve, and a supporting born connected to the ultrasonic vibrator. The supporting born comprises a main body, a base portion formed in a brim shape on an outer peripheral face of the main body, a damping sleeve formed by extending the brim-shaped base portion in an axial direction, a loose flange and a fixing flange respectively formed on both ends of the damping sleeve, and a buffer groove formed on an outer peripheral face of the base portion. The loose flange is disposed on the side of the ultrasonic vibrator in a state that it is slidable to and has contact with an inner peripheral face of the main body sleeve, and the fixing flange is restrained in the axial direction. The supporting horn is housed in the main body sleeve.

However, the ultrasonic vibrator disclosed by US Pat. No. 6,762,535 does not have pre-pressure and is only connected to the supporting born functioning as a medium and not directly connected to the rotor. Meanwhile, length of the ultrasonic vibrator is preferable to be set to ½ of the wavelength of an ultrasonic wave. That is, the design of the supporting horn is rather complicated. Also, this prior art uses the loose flange to guide vibration of a working tool in an axial direction and strengthen radial rigidity of the working tool.

US Pat. No. 7,175,506 discloses a tool unit for the ultrasonically assisted rotary machining of a workpiece. The tool unit is applied in a spindle of a machine comprising a retainer. The tool unit comprises a holder at least partially insertable in the retainer, a converter disposed inside the holder, and an electroacoustic transducer disposed inside the converter for generating and transmitting ultrasonic vibration, the holder can be detachably connected to the retainer.

However, the ultrasonic vibrator disclosed by US Pat. No. 7,175,506 also does not have pre-pressure and is only connected to the converter functioning as a medium and not directly connected to the rotor. Meanwhile, length of the ultrasonic vibrator is preferable to be set to ½ of the wavelength of an ultrasonic wave. That is, the design of the converter is rather complicated. Also, this prior art uses a seal ring to guide vibration of a working tool in an axial direction and strengthen radial rigidity of the working tool.

Therefore, there is a need to develop a technique capable of overcoming the above-described drawbacks.

SUMMARY OF THE INVENTION

According to the above drawbacks, an objective of the present invention is to provide a spindle and a flexible hinge used in an ultrasonic machine through which an adjustable pre-pressure can be provided to the vibration unit.

Another objective of the present invention is to provide a spindle and a flexible hinge used in an ultrasonic machine that eliminates the design restriction on length and increases design flexibility.

A further objective of the present invention is to provide a spindle and a flexible hinge used in an ultrasonic machine that strengthens radial rigidity of a working tool to facilitate machining and vibrating at the same time.

In order to attain the above and other objectives, the present invention provides a spindle of an ultrasonic machine for transmitting vibration to a working tool of the ultrasonic machine, comprising: a main body; a rotor disposed inside the main body; an elastic clamping unit disposed inside the rotor, wherein the elastic clamping unit comprises a clamping element for clamping the working tool and a flexible hinge contacting the clamping element; a vibrating unit for providing the elastic clamping unit with vibration against the rotor, wherein one end of the vibrating unit is connected to an inner wall of the rotor and the other end of the vibrating unit is connected to the flexible hinge; and a pre-pressure unit penetrating the rotor, wherein one end of the pre-pressure unit is connected to the flexible hinge, the pre-pressure unit is used for providing the elastic clamping unit with rigidity against the rotor such that the elastic clamping unit can provide pre-pressure to the vibrating unit.

Therein, the main body of the spindle has a hollow cylindrical receiving space for receiving the rotor. The rotor has a receiving space for receiving the elastic clamping unit. A bearing is disposed between an outer wall of the rotor and an inner wall of the main body. According to an embodiment, bearings are respectively disposed on upper and lower ends of the space between the outer wall of the rotor and the inner wall of the main body. The bearing located on the upper end is connected to a nut disposed to the outer wall of the rotor. The bearing can be a roller bearing. The flexible hinge comprises a hollow cylindrical main body and a plurality of flexible buffer portions disposed in the hollow cylindrical main body. In one embodiment, the hollow cylindrical main body has a radial flexible buffer portion extending downward and outward, the elastic clamping unit is fixed to the rotor through the radial flexible buffer portion. The flexible buffer portions are slots. The flexible buffer portions are staggered. The vibrating unit, the elastic clamping unit, the rotor and the main body are coaxially disposed. Preferably, the vibrating unit is a piezoelectric crystal. In one embodiment, the spindle further comprises a slip ring disposed to the outside of the rotor. The slip ring can be located on the upper end of the outside of the rotor, and can be such as a carbon brush slip ring. The pre-pressure unit comprises a pressure adjusting element disposed on the upper end of the outside of the rotor and a pushing element penetrating the pressure adjusting element. Therein, the pressure adjusting element is one of a disc spring and a lock nut. The pushing element is a rod. The lower end of the vibrating unit is located at the outside of the pushing element, and the flexible hinge comprises a hollow cylindrical main body and the upper end of the main body has a concave portion corresponding to the pushing element.

The present invention further provides a flexible hinge of a spindle applied in an ultrasonic machine for transmitting vibration to a working tool of the ultrasonic machine, wherein the spindle comprises a main body, a rotor disposed inside the main body and a clamping element disposed inside the rotor for clamping the working tool, the flexible hinge comprises: a hollow cylindrical main body; and a plurality of flexible buffer portions disposed in the hollow cylindrical main body.

Compared with the prior art, the present invention transmits high frequency micro-vibration to the working tool by using the flexible hinge as medium. Thus, the working tool has axial vibration while rotating. Thereby, brittle material such as semiconductor, ceramic, glass and hard alloy can be machined through the ultrasonic machining technique. Meanwhile, the flexible hinge of such as hollow cylinder shape can be machined through a wire-cut electrical discharge machining. Axial rigidity of the flexible hinge can be changed through design.

BRIEF DESCRIPTION OF DRAWINGS

FIGS. 2B and 2C are diagrams of the flexible hinge according to the preferred embodiment of the present invention, wherein FIG. 2B is a sectional view of FIG. 2A along AA line and FIG. 2C is a sectional view of FIG. 2A along BB line.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

FIGS. 1 to 3B are diagrams showing a spindle and a flexible hinge according to preferred embodiments of the present invention. Therein, the spindle 1 is disposed in an ultrasonic machine for transmitting vibration to a working tool 3 of the ultrasonic machine. In the present embodiment, the working tool 3 is an end mill. To make characteristics and structures of the present invention become much more clear and for purpose of simplification, the drawings only show structures directly related to the present invention.

Figure 1:
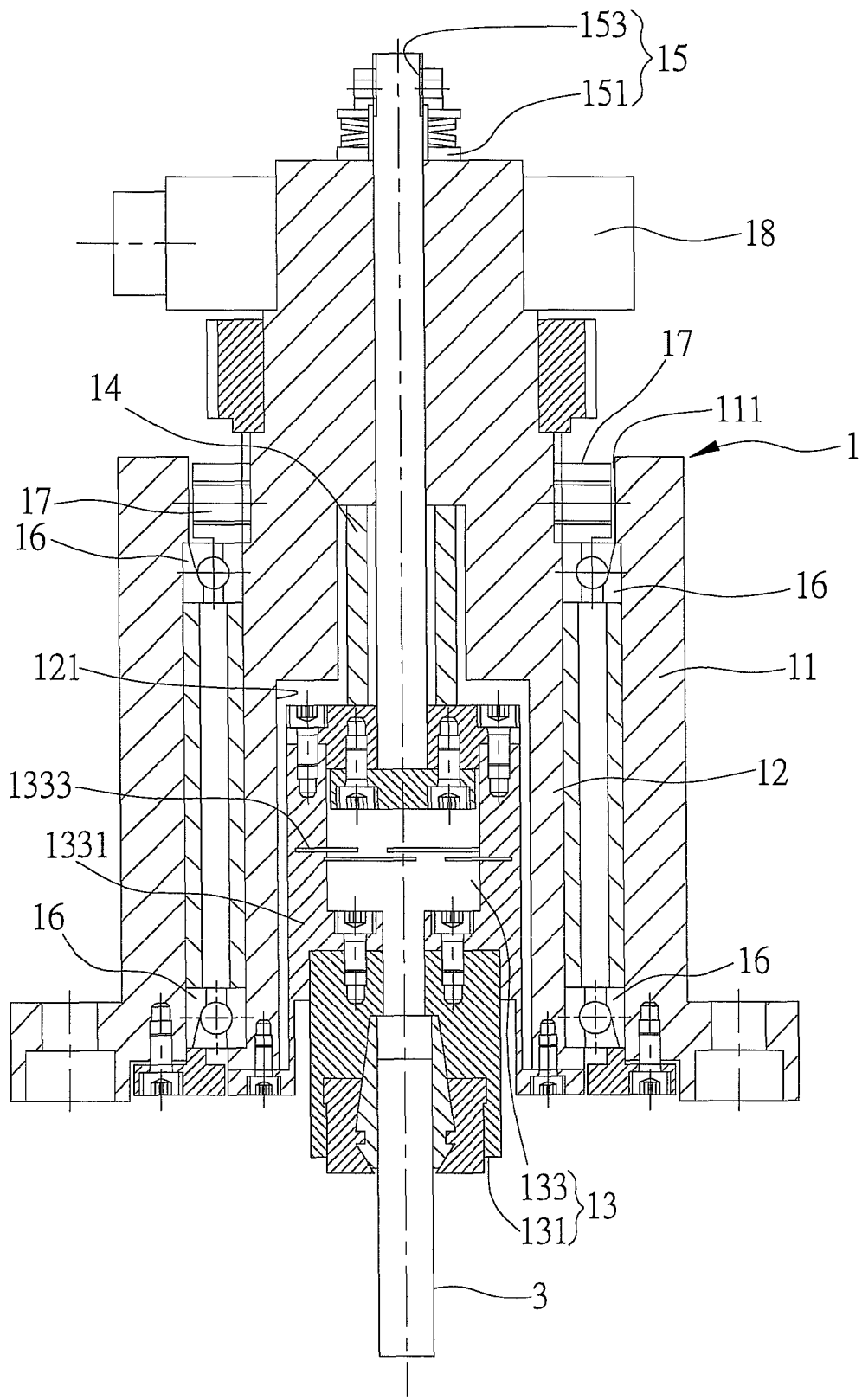
FIG. 1 is a diagram showing a spindle according to a preferred embodiment of the present invention.

As shown in FIG. 1, the spindle 1 of the ultrasonic machine comprises: a main body 11; a rotor 12 disposed inside the main body 11; an elastic clamping unit 13 disposed inside the rotor 12, wherein the elastic clamping unit 13 comprises a clamping element 131 for clamping the working tool 3 and a flexible hinge 133 contacting the clamping element 131; a vibrating unit 14 for providing the elastic clamping unit 13 with vibration against the rotor 12, wherein one end of the vibrating unit 14 is connected to inner wall of the rotor 12 and the other end thereof is connected to the flexible hinge 133; and a pre-pressure unit 15 penetrating the rotor 12, wherein one end of the pre-pressure unit 15 is connected to the flexible hinge 133 for providing the elastic clamping unit 13 with rigidity against the rotor 12 such that the elastic clamping unit 13 can provide pre-pressure to the vibrating unit 14.

The main body 11 of the spindle 1 has a receiving space 111 of such as a hollow cylinder shape for receiving the rotor 12. An upper end of the main body 11 can be connected to a driving motor (not shown) through a transmission element. Since technique of connecting the upper end of the main body 11 to the driving motor is well know in the art, detailed description thereof is omitted.

The spindle 1 can further comprise such as an ultrasonic oscillator and so on. It should be noted that the present embodiment only illustrates basic configuration of the present invention, shapes, quantities and scales of the elements in practice can be varied and detailed arrangement of the elements can be more complicated.

The rotor 12 has a receiving space 121 for receiving the elastic clamping unit 13. Further, a bearing 16 can be selectively disposed between an outer wall of the rotor 12 and an inner wall of the main body 11 of the spindle 1. In the present embodiment, bearings 16 are respectively disposed on upper and lower ends of the space between the outer wall of the rotor 12 and the inner wall of the main body 11 of the spindle 1. The bearing 16 on the upper end is connected to a nut 17 disposed on the outer wall of the rotor 12. The bearings 16 can be roller bearings, which however are not limited thereto.

Figure 2A:
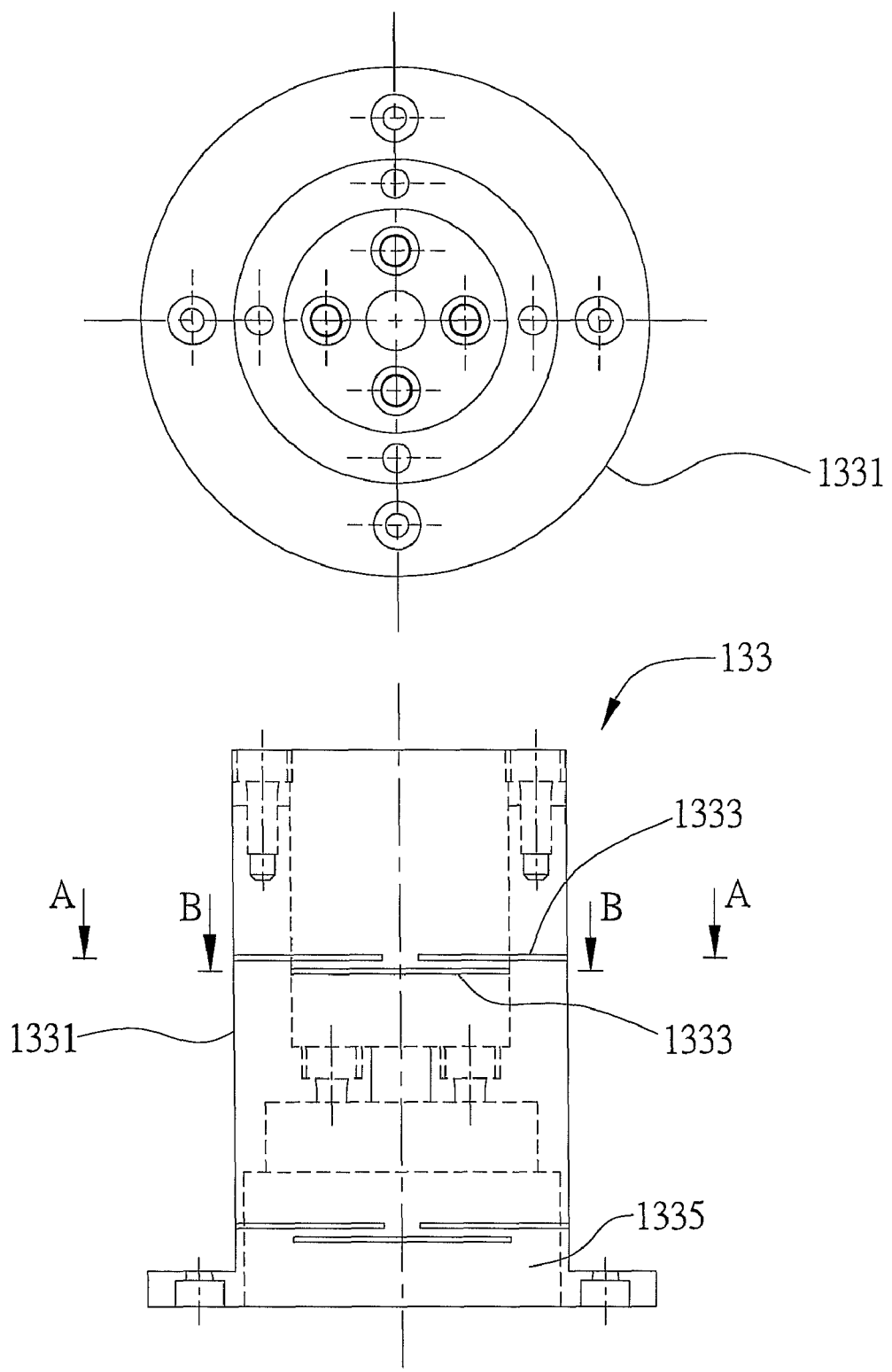
FIG. 2A is a diagram of a flexible hinge shown in FIG. 1, wherein FIG. 2A show two views of the flexible hinge of FIG. 1.

The clamping element 131 is used for clamping the working tool 3. The elastic clamping unit 13 provides a flexible structure for transmitting vibration to the working tool 3. As shown in FIGS. 1 and 2A, the flexible hinge 133 comprises a hollow cylindrical main body 1331, and a plurality of flexible buffer portions 1333 disposed inside the hollow cylindrical main body 1331. As shown in FIG. 2A, the hollow cylindrical main body 1331 has a radial flexible buffer portion 1335 extending downward and outward. The radial flexible buffer portion 1335 fixes the elastic clamping unit 13 to the rotor 12. For example, the radial flexible buffer portion 1335 locks the elastic clamping unit 13 to the bottom surface of the rotor 12. The lower end of the hollow cylindrical main body 1331 can be locked to the clamping element 131. The flexible buffer portions 1333 can be such as slots. Rigidity of the flexible hinge 133 can be obtained by calculating sectional sizes of the flexible buffer portions 1333, which is described later.

Figure 2B:
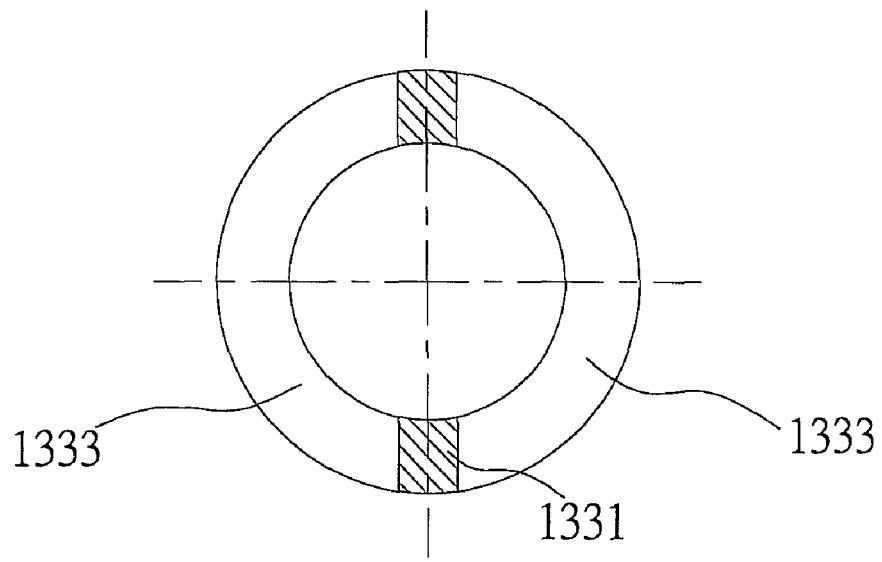
Figure 2C:
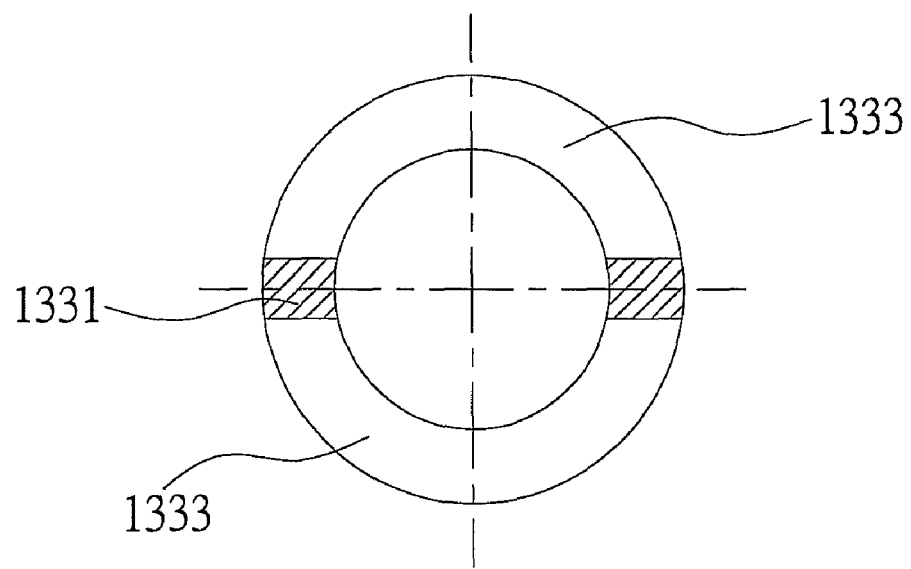

As shown in FIGS. 2B and 2C, in the present embodiment, the flexible hinge 133 has such as two flexible buffer portions 1333, and the flexible buffer portions 1333 are staggered such that the hollow cylindrical main body 1331 can achieve an elastic deformation capability. In other words, the flexible buffer portions 1333 are slots formed by bisection, which however are not limited thereto.

Figure 3A:
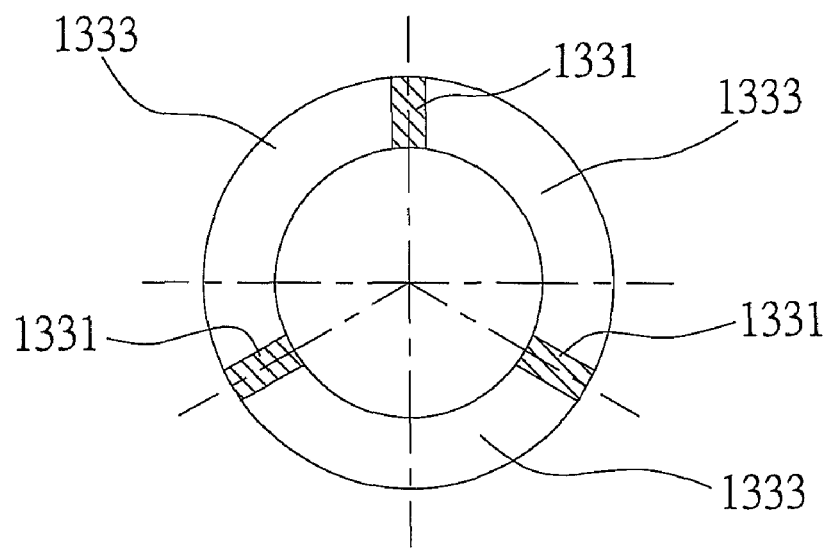
FIGS. 3A and 3B are diagrams of the flexible hinge according to another embodiment of the present invention.
Figure 3B:
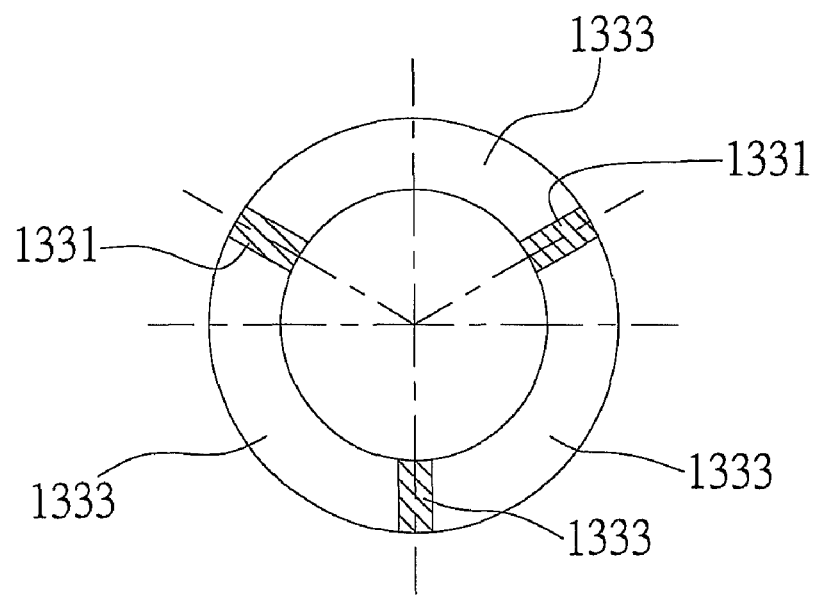

For example, as shown in FIGS. 3A and 3B, the flexible buffer portions 1333 are slots formed by trisection. In other words, the flexible buffer portions 1333 can be slots formed by bisection, trisection, quadrisection and so on. Therefore, those skilled in the art will understand that any equivalent structure can be applied as long as it can provide staggered flexible buffer portions 1333 such that the hollow cylindrical main body 1331 can achieve an elastic deformation capability.

Furthermore, the flexible buffer portions 1333 can be formed in the hollow cylindrical main body 1331 by such as wire-cut electrical discharge machining. Length and width of the flexible buffer portions 1333 can be designed so as to change rigidity of the flexible hinge 133. Thereby, the axial rigidity of the flexible hinge 133 can be designed so as to generate flexibility functioning as medium for energy transmission. Of course, the method for forming the flexible buffer portions 1333 is not limited to the wire-cut electrical discharge machining.

The vibrating unit 14 generates high frequency vibration. The vibrating unit 14 is disposed between the elastic clamping unit 13 and the rotor 12, and flush with the axis of the elastic clamping unit 13, the rotor 12 and the main body 11 of the spindle 1. In other words, the main body 11, the rotor 12, the elastic clamping unit 13 and the vibrating unit 14 are coaxially disposed. In the present embodiment, the vibrating unit 14 can be such as a piezoelectric crystal, which has characteristics of nanoscale vibration and high bandwidth input output and can be applied to the spindle of an ultrasonic machine.

If the vibrating unit 14 is a piezoelectric crystal, when energy such as electricity is applied to the vibrating unit 14, a sonic energy in a limited frequency range is generated, thereby providing high frequency micro-vibration. For example, in order to apply energy to the vibrating unit 14, wires or leads (not shown) can be passed through the inside of the rotor 12 so as to electrically connect the vibrating unit 14 to a slip ring 18 as shown in FIG. 1. The slip ring 18 is disposed to the outside of the rotor 12. For example, the slip ring 18 can be disposed to the upper end of the outside of the rotor 12. The slip ring 18 can be such as a carbon brush slip ring. Thus, voltage and frequency of the vibrating unit 14 can be controlled from outside of the spindle 1.

The vibrating unit 14 can be any vibrating unit capable of generating high frequency vibration, and it is not limited to the present invention. Meanwhile, techniques of providing electricity to the vibration unit 14 and controlling voltage and frequency of the vibrating unit 14 are well known in the art and not limited to the present invention, detailed description thereof is omitted.

The pre-pressure unit 15 comprises a pressure adjusting element 151 disposed on an upper end of the outside of the rotor 12 and a pushing element 153 penetrating the pressure adjusting element 151, wherein the lower end of the vibrating unit 14 can be located at the outside of the pushing element 153. In the present embodiment, the pressure adjusting element 151 can be such as a disk spring, the pushing element 153 can be such as a rod. In other embodiments, the pressure adjusting element 151 can be such as lock nut or other equivalent element capable of adjusting the pressure exerted on the flexible hinge 133 by the pushing element 153. Meanwhile, the upper end of the hollow cylindrical main body 1331 has a concave portion disposed corresponding to the pushing element 153 so as to ensure one end of the pushing element 153 of the pre-pressure unit 15 can be connected to the flexible hinge 133, thereby providing an adjustable pre-pressure.

When the vibrating unit 14 generates high frequency micro-vibration in the axial direction, the vibration is transmitted to the flexible hinge 133, and the flexible hinge 133 further transmits the high frequency vibration wave to the working tool 3. Thus, the working tool 3 makes axial linear movement with high frequency amplitude such as 1 μm to 5 μm. At this time, the working tool 3 with high frequency vibration contacts surface of the workpiece (not shown) for machining. Therein, the workpiece can be made of brittle material such as semiconductor, ceramic, glass or hard alloy. Meanwhile, the pre-pressure unit 15 can apply a pre-pressure on the vibrating unit 14. For example, by adjusting the pressure adjusting element 151, pre-pressure applied to the vibrating unit 14 by the pushing element 153 can be changed and rigidity of the vibrating unit 14 can be changed. However, the radial force generated by the working tool 3 is guided by the radial flexible buffer portion 1335 such that the working tool 3 can make axial vibration and meanwhile the radial rigidity of the working tool 3 can be increased.

As shown in FIG. 1, through the above-described configuration, the pre-pressure unit 15, the vibrating unit 14 and the elastic clamping unit 13 in the rotor 12 form a suspension relation so as to adjust the resonance frequency of the vibrating unit 14, thereby making the amplitude of the vibrating unit 14 become stable. For example, in high frequency vibration, pre-pressure of the vibrating unit 14 can be increased so as to make rigidity of the elastic clamping unit 13 correspond to the vibrating unit 14, thereby achieving a higher resonance frequency.

In addition, the vibration model formed through suspension is illustrated as follows.

Suppose $m_1$ is the mass between the flexible hinge 133 and the vibration unit 14, $m_2$ is the total mass below the flexible hinge 133 comprising the working tool 3, $k_1$ is the combined rigidity of the vibrating unit 14 and the pressure adjusting element 151, $k_2$ is the rigidity obtained through the design (between the vibrating unit 14 and the working tool 3), $k_3$ is the rigidity obtained through design of the radial flexible buffer portion 1335 (between the working tool 3 and the rotor 12), f*sin(wt) is an outputted sine wave of the vibrating unit 14, $x_1$ is the outputted displacement of the vibrating unit 14, and $x_2$ is the outputted displacement of the working tool 3.

Assume that $K_p$ is the rigidity of the vibrating unit 14, and $K_s$ is the rigidity of the pressure adjusting element 151, $k_1$ is equal to:

$$K_1 = \frac{1}{K_P + K_S} \quad \text{equation (1)}$$

During undamped free vibration, as shown in equation (2);

$$\begin{bmatrix} m_1 & 0 \\ 0 & m_2 \end{bmatrix} \begin{Bmatrix} \ddot{x}_1 \\ \ddot{x}_2 \end{Bmatrix} + \begin{bmatrix} k_{11} & k_{12} \\ k_{21} & k_{22} \end{bmatrix} \begin{Bmatrix} x_1 \\ x_2 \end{Bmatrix} = \begin{Bmatrix} F_1 \\ 0 \end{Bmatrix} \sin(\omega t), \text{ wherein}$$

$$k_{11} = k_1 + k_2, k_{12} = -k_2, k_{21} = -k_2, k_{22} = k_2 + k_3.$$

wherein

Moreover, as shown in equation (3):

$$\begin{bmatrix} k_{11} - m_1\omega^2 & k_{12} \\ k_{21} & k_{22} - m_1\omega^2 \end{bmatrix} \begin{Bmatrix} X_1 \\ X_2 \end{Bmatrix} = \begin{Bmatrix} F_1 \\ 0 \end{Bmatrix}.$$

Therefore, $x_1$ and $x_2$ can be calculated out through the above equations. Thereafter, displacement functions using equation $$\begin{Bmatrix} x_1 \\ x_2 \end{Bmatrix} = \begin{Bmatrix} X_1 \\ X_2 \end{Bmatrix} \sin(\omega t),$$

can be obtained.

Dimensionless $x_2/x_1$ is ratio of output displacement and input displacement, dimensionless $k_2/k_1$ is rigidity ratio, by designing suitable rigidity ratio $k_2/k_1$ in combination with input function frequency, resonance phenomenon of the vibration system can be prevented.

Compared with the prior art, the present invention transmits high frequency micro-vibration through the flexible hinge. The high frequency axial vibration generated by the vibrating unit is transmitted to the working tool. Thus, the working tool makes milling and vibration while contacting the workpiece. Meanwhile, by designing size of the vibrating unit, rigidity of the flexible hinge can be changed. Furthermore, the flexible hinge can make the radial force from the working tool capable of being guided by the radial flexible buffer portion such that the working tool can make axial vibration and meanwhile the radial rigidity of the working tool can be increased.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A spindle of an ultrasonic machine for transmitting vibration to a working tool of the ultrasonic machine, comprising:
   a main body;
   a rotor disposed inside the main body;
   an elastic clamping unit disposed inside the rotor, wherein the elastic clamping unit comprises a clamping element for clamping the working tool and a flexible hinge contacting the clamping element;
   a vibrating unit for providing the elastic clamping unit with vibration against the rotor, wherein one end of the vibrating unit is connected to an inner wall of the rotor and the other end of the vibrating unit is connected to the flexible hinge; and
   a pre-pressure unit penetrating the rotor, wherein one end of the pre-pressure unit is connected to the flexible hinge, allowing the pre-pressure unit to be used for providing the elastic clamping unit with rigidity against the rotor such that the elastic clamping unit can provide pre-pressure to the vibrating unit.

2. The spindle of claim 1, wherein the main body has a hollow cylindrical receiving space for receiving the rotor.

3. The spindle of claim 1, wherein the rotor has a receiving space for receiving the elastic clamping unit.

4. The spindle of claim 1, wherein a bearing is disposed between an outer wall of the rotor and an inner wall of the main body.

5. The spindle of claim 4, wherein the bearing is a roller bearing.

6. The spindle of claim 1, wherein bearings are respectively disposed on upper and lower ends of a space between the outer wall of the rotor and the inner wall of the main body.

7. The spindle of claim 6, wherein one of the bearings located on the upper end is connected to a nut disposed to the outer wall of the rotor.

8. The spindle of claim 1, wherein the flexible hinge comprises a hollow cylindrical main body and a plurality of flexible buffer portions disposed in the hollow cylindrical main body.

9. The spindle of claim 8, wherein the hollow cylindrical main body has a radial flexible buffer portion extending downward and outward, the radial flexible buffer portion fixes the elastic clamping unit the rotorby.

10. The spindle of claim 8, wherein the flexible buffer portions are slots.

11. The spindle of claim 8, wherein the flexible buffer portions are staggered.

12. The spindle of claim 1, wherein the vibrating unit, the elastic clamping unit, the rotor and the main body are coaxially disposed.

13. The spindle of claim 1, wherein the vibrating unit is a piezoelectric crystal.

14. The spindle of claim 1, further comprising a slip ring disposed to the outside of the rotor.

15. The spindle of claim 14, wherein the slip ring is a carbon brush slip ring located on the upper end of the outside of the rotor.

16. The spindle of claim 1, wherein the pre-pressure unit comprises a pressure adjusting element disposed on the upper end of the outside of the rotor and a pushing element penetrating the pressure adjusting element.

17. The spindle of claim 16, wherein the pressure adjusting element is one of a disc spring and a lock nut.

18. The spindle of claim 16, wherein the pushing element is a rod.

19. The spindle of claim 16, wherein the lower end of the vibrating unit is located at the outside of the pushing element.

20. The spindle of claim 16, wherein the flexible hinge comprises a hollow cylindrical main body and the upper end of the main body has a concave portion corresponding to the pushing element.

21. A flexible hinge of a spindle applied in an ultrasonic machine for transmitting vibration to a working tool of the ultrasonic machine, wherein the spindle comprises a main body, a rotor disposed inside the main body and a clamping element disposed inside the rotor for clamping the working tool, the flexible hinge comprising:
   a hollow cylindrical main body; and
   a plurality of flexible buffer portions disposed in the hollow cylindrical main body.

22. The flexible hinge of claim 21, wherein the hollow cylindrical main body has a radial flexible buffer portion extending downward and outward and fixed to the rotor.

23. The flexible hinge of claim 21, wherein the flexible buffer portions are slots.

24. The flexible hinge of claim 21, wherein the flexible buffer portions are staggered.

* * * * *